United States Patent Office 3,147,083
Patented Sept. 1, 1964

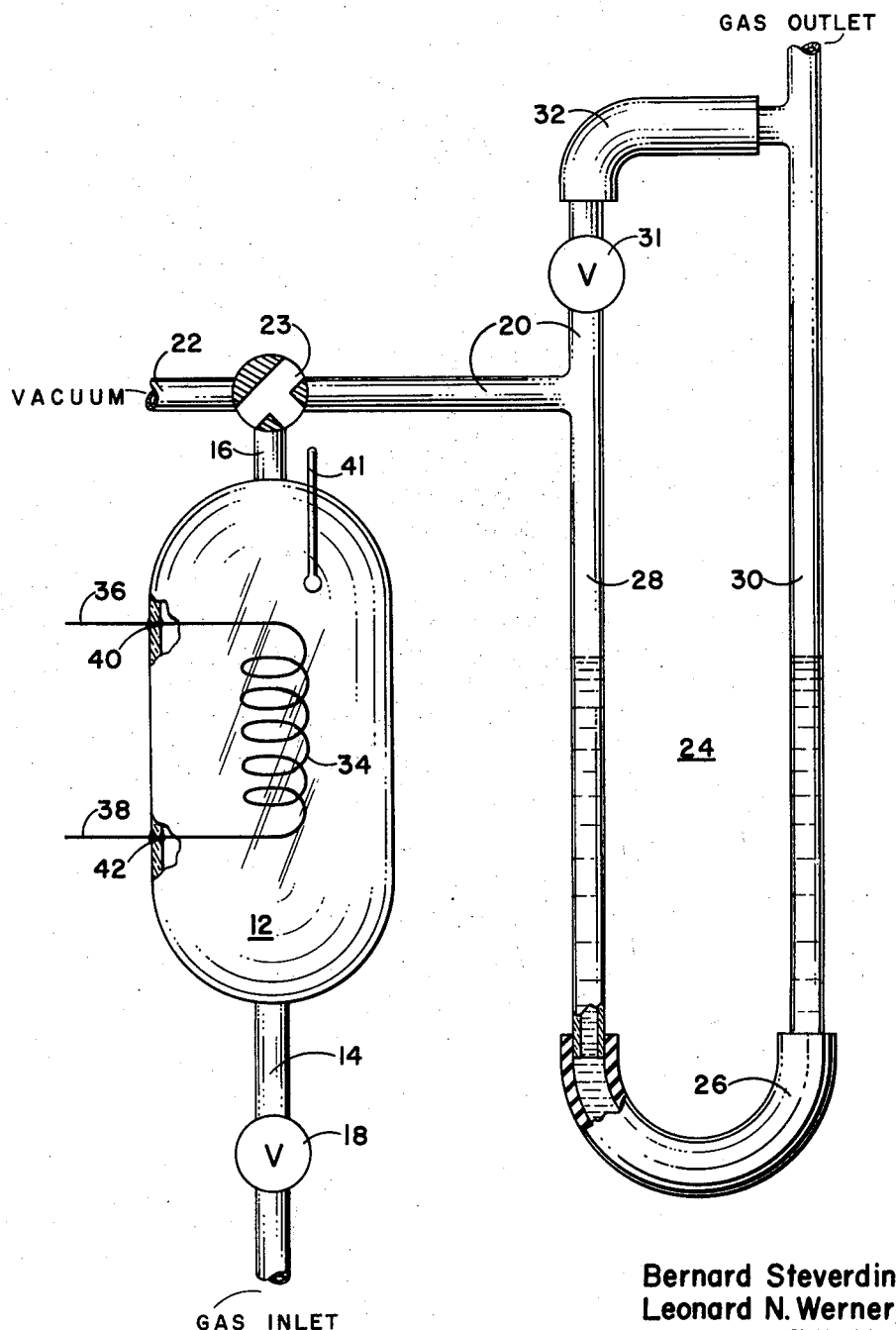

3,147,083
METHOD AND DEVICE FOR THE DETERMINATION OF IMPURITIES IN INERT GASES
Bernard Steverding, 1711 Oakwood Ave., and Leonard N. Werner, 720 Holmes Ave. NE., both of Huntsville, Ala.
Filed Jan. 8, 1962, Ser. No. 165,046
7 Claims. (Cl. 23—232)
(Granted under Title 35, U.S. Code (1952), sec. 266)

The invention described herein may be manufactured and used by or for the Government for governmental purposes without the payment of any royalty thereon.

This application pertains to an apparatus and method for the determination of impurities in inert gases.

In the metallurgy of the reactive metals, inert gases are often used to prevent atmospheric contamination from the environment while the metals are processed at high temperatures. Some processes utilizing inert gases are the argon arc melting process, helium arc welding, and certain heat treatments. In each case, the success of the process and the quality of the finished product are largely dependent on the purity of the inert gas used.

A conventional process to determine the percentage of impurities such as oxygen and nitrogen in an inert gas is by mass spectroscopy, but this process is very expensive.

It is, therefore, an object of our invention to provide an inexpensive device, simple in operation and accurate to a high degree, to determine the purity of inert gases.

It is a further object of our invention to provide a simple method by which a determination may be made of the level of impurities in inert gases.

The method of determining the amount of impurities in an inert gas is to first evacuate a vessel with coils therein. The coils are then heated to remove moisture from the walls of the vessel. The vessel is purged for approximately ten minutes and a sample of inert gas is fed into the vessel. The pressure inside the vessel is equalized to that of the atmosphere. The coil is then heated to getter the impurities in the sample.

To measure oxygen the sample is heated to approximately 650° C., and then allowed to cool to the initial temperature, the difference in the level of mercury in a U-tube, disposed in communication with the vessel, is ascertained. This difference being proportionate to the amount of the removed oxygen.

The apparatus of our invention is comprised of a vessel having inlet and outlet tubes. A T-junction in the outlet tube connects the vessel to a vacuum pump and to both branches of a U-tube with mercury therein.

A getter coil, placed in the vessel communicates with a device which heats the coil to a desired temperature to concentrate thereat the gaseous impurities.

A nitrogen analysis is obtained in a similar manner, except that the getter temperature is raised to 1100° C. At this temperature the oxygen, of the oxide scale diffuses into the metal and the nitrogen reaction commences.

Other objects and advantages will become readily apparent from the following description taken in conjunction with the accompanying drawings in which the sole figure is a view of the apparatus of our invention.

As shown in the sole figure, a glass vessel 12 is provided with inlet and outlet tubes 14 and 16, respectively. The inlet tube is provided with a stopcock 18. The outlet tube communicates with a tube 20. Tube 20 includes one end 22 which communicates with a vacuum producing apparatus. A 3-way stopcock 23 is disposed at the junction of tube 20 and outlet 16. Tube 20 is extended to communicate with a U-tube 24.

The U-tube is comprised of a pair of capillary tubes 28 and 30 connected at the bottom by a rubber hose 26. Tube 20 extends upward from its juncture with capillary tube 28 and connects, by means of a rubber hose 32, to tube 30. A stopcock 31 is disposed in tube 20, intermediate its junction with tube 28 and its connection with rubber hose 32.

A getter coil 34, preferably made of tantalum is provided within the vessel, the coil 34 includes a pair of lead throughs or end portions 36 and 38. The vessel is vacuum sealed at the points 40 and 42 which are the points at which portions 36 and 38, respectively, extend through vessel 12.

In operation, the vessel is evacuated and coil 34 is heated to remove moisture from the walls of the vessel to permit more accurate measurements. The vessel is then allowed to cool and with stopcock 23 closed to the vacuum side and stopcocks 18 and 31 open, gas is fed under pressure through vessel 12, for approximately ten minutes to purge the apparatus.

After purging is accomplished, and with the vessel filled with gas, stopcock 23 is closed to vacuum only and stopcocks 18 and 31 are closed to retain the gas in vessel 12 and to equalize the gas pressure within the vessel with the outside pressure.

Coil 34 is then heated by conventional means, such as a source of current being applied to the coil through the portions 36 and 38.

The getter coil is heated to approximately 650° C. which causes oxygen to be deposited on the surface of the coil. As a result of the gas expanding during the heating thereof, the mercury in the left leg 28 of U-tube 24 is forced downward. After the gettering procedure, the inert gas is allowed to cool and, therefore, contracts to a volume that is smaller than the original volume by the amount of removed oxygen.

If the amount of impurities is very small, the level of the mercury column in tubes 28 and 30 can be balanced by moving the right capillary tube 30 until the mercury level in tubes 28 and 30 and equalized. With the pressure now equalized, the difference in height between the equilibrium levels before and after gettering is ascertained to determine the amount of oxygen removed from the inert gas.

However, if the impurities in the inert gas are relatively high and the mercury columns cannot be balanced, a second means of determining the amount of impurities in the gas must be used. This non-balancing method must not only take into consideration the volume difference but also the pressure lowering in the vessel caused by the removed impurities and is achieved in the following manner:

To determine the amount of removed oxygen, the height difference is translated into percentage by the following computations. Let $L$=the difference in height of the mercury columns, $Q$=cross section of the U-tube; then $L \times Q$=volume of the trapped oxygen. If the volume of the container, i.e., the volume between stopcocks 18, 23, and 32=$Q$; then the oxygen contamination, expressed in volume percentage is $$\frac{L \times Q \times 100}{Q}$$

Therefore, if $V_1$ and $P_1$ are the volume and pressure prior to the gettering procedure and $V_2$ and $P_2$ the volume and pressure after the gettering process and if $N'$ and $N''$ are the mole numbers of the impurities and the inert gas, respectively and T is the ambient temperature.

The volume $V_1$ of the contaminated gas at ambient pressure P and temperature T is given by:

$$V_1 = N'\frac{RT}{P} + N''\frac{RT}{P}$$

After the impurity is gettered and the inert gas has again reached the ambient temperature T and the atmospheric pressure P, it has the volume $V_2$:

$$V_2 = N'' \frac{RT}{P}$$

Subtracting the two equations yields:

$$V_1 - V_2 = N' \frac{RT}{P_1} + \frac{N''}{P_1}(P_2 - P_1)$$

$$\frac{(V_1-V_2)P_1 - (P_2-P_1)V_2}{V_1 P_1} = \frac{N'}{N'+N''}$$

$$\frac{N'}{N'+N''} = \text{degree of contamination}$$

The process as set forth above is preferably carried out while the vessel and U-tubes are submerged in a constant temperature bath or in an environment wherein the temperature is maintained at a constant level. It may be desirable to add a thermometer 41 to the vessel for monitoring the temperature therein.

While the foregoing has been a description of a preferred embodiment of our invention, it is to be understood that certain modifications may be resorted to that is within the spirit and scope of our invention.

We claim:

1. An apparatus for determination of impurities in samples of inert gases comprising a vessel having inlet and outlet conduits and including a chamber for receiving a sample of inert gas therein; a U-tube provided with columns of mercury; a vacuum producing device disposed in communication with said chamber and said U-tube for evacuation thereof; an element positioned in said chamber and connected to a source of electrical energy, for energization thereof, said element disposed to getter the impurities in the gas responsive to the energization of the element; said mercury columns disposed to be displaced by an amount proportionate to the amount of gettered impurities responsive to the heating of said element.

2. The apparatus of claim 1 including a tube connected to said vessel outlet and communicating with said vacuum producing device and said U-tube; a stopcock disposed on said vessel inlet and operable to allow the gas to enter the vessel and to seal off the vessel responsive to entry of gas therein; a second stopcock disposed at the junction of said outlet and said tube and operative to allow the apparatus to be evacuated and to seal off the apparatus responsive to the evacuation; a third stopcock disposed on said U-tube and operative to equalize pressure within the U-tube and the atmosphere and to seal off the apparatus to the atmosphere responsive to the pressure equalization.

3. The apparatus of claim 1 including means for monitoring the temperature therein.

4. The apparatus of claim 1 wherein said gettering element is a helical tantalum coil.

5. A method of determining the amount of impurities in an inert gas in an apparatus including a vessel provided with a getter coil therein and having a U-tube, containing columns of mercury, in communication with said vessel, which comprises the steps of evacuating the vessel, filling the vessel with the inert gas, maintaining said apparatus under constant temperature, equalizing the pressure within the apparatus to the pressure outside of the apparatus, electrically energizing the coil to a predetermined level of temperature to getter the impurities thereon, cooling the inert gas, determining the height difference in the mercury columns before and after gettering, the difference being proportionate to the amount of removed impurities.

6. The method as set forth in claim 5 wherein the coil is of tantalum metal and said predetermined level is approximately 650° C. for removal of oxygen.

7. The method as set forth in claim 5 wherein the coil is of tantalum metal and said predetermined level is approximately 1100° C. for removal of nitrogen.

References Cited in the file of this patent

UNITED STATES PATENTS

| 2,156,974 | Doan | May 2, 1939 |
| 2,533,138 | Newton | Dec. 5, 1950 |
| 2,547,874 | Klema | Apr. 3, 1951 |

FOREIGN PATENTS

| 128,195 | Russia | Apr. 28, 1960 |

OTHER REFERENCES

Severyns: "Ind. and Eng. Chem." (Anal. Chem.), 4, 371–373 (1932).

Dombrowski: "Anal. Chem.," 26, 526–528 (1954).

Hobbs: "Anal. Chem.," pages 57R and 62R, vol. 32, No. 5, April 1960.

Morozov: "Analytical Abstracts," 8, 1905 (1961), abstract of U.S.S.R. Patent 128,195, April 28, 1960.